United States Patent
Zheng et al.

(10) Patent No.: US 10,782,679 B2
(45) Date of Patent: Sep. 22, 2020

(54) RELATIONSHIP TAGGING OF DATA IN WELL CONSTRUCTION

(71) Applicant: Schlumberger Technology Corporation, Sugar Land, TX (US)

(72) Inventors: Shunfeng Zheng, Katy, TX (US); Vishwanathan Parmeshwar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 442 days.

(21) Appl. No.: 15/379,733

(22) Filed: Dec. 15, 2016

(65) Prior Publication Data

US 2018/0171760 A1    Jun. 21, 2018

(51) Int. Cl.
| | | |
|---|---|---|
| *E21B 41/00* | (2006.01) | |
| *G05B 19/048* | (2006.01) | |
| *G05B 23/02* | (2006.01) | |
| *G06F 17/30* | (2006.01) | |
| *E21B 21/01* | (2006.01) | |
| *E21B 19/14* | (2006.01) | |
| *G06F 16/29* | (2019.01) | |
| *G05B 19/042* | (2006.01) | |

(52) U.S. Cl.
CPC .......... *G05B 23/0283* (2013.01); *E21B 19/14* (2013.01); *E21B 21/01* (2013.01); *G06F 16/29* (2019.01); *G05B 19/042* (2013.01); *G05B 2219/45129* (2013.01)

(58) Field of Classification Search
CPC .................................................. G05B 23/0283
See application file for complete search history.

(56) References Cited

U.S. PATENT DOCUMENTS

| | | |
|---|---|---|
| 66,210 A | 11/1900 | Bell |
| 6,931,621 B2 | 8/2005 | Green et al. |
| 7,172,037 B2 | 2/2007 | Dashevskiy et al. |
| 7,264,050 B2 | 9/2007 | Koithan et al. |
| 7,357,196 B2 | 4/2008 | Goldman et al. |
| 7,895,220 B2 | 2/2011 | Evans et al. |
| 7,945,488 B2 | 5/2011 | Karr et al. |
| 8,103,493 B2 | 1/2012 | Sagert et al. |
| 8,131,510 B2 | 3/2012 | Wingky et al. |
| 8,145,464 B2 | 3/2012 | Arnegaard et al. |

(Continued)

FOREIGN PATENT DOCUMENTS

| | | |
|---|---|---|
| WO | 2017204655 A1 | 11/2017 |
| WO | 2018213126 A1 | 11/2018 |

*Primary Examiner* — Moazzam Hossain
(74) *Attorney, Agent, or Firm* — Rachel E. Greene (57) ABSTRACT

Processing systems and methods for receiving captured data of a data source attached with an expression of a relationship between the data source and a well construction system. The expression of the relationship between the data source and the well construction system is matched with an expression in a relationship descriptor including a description of a well construction system physical layout. The relationship descriptor also includes respective expressions of relationships between data sources and locations, equipment, and/or components of the well construction system. The expression in the relationship descriptor is one of the respective expressions. Secondary information is determined based on the captured data and the matched expression in the relationship descriptor.

20 Claims, 4 Drawing Sheets

(56) References Cited

U.S. PATENT DOCUMENTS

| | | |
|---|---|---|
| 8,301,386 B1 | 10/2012 | Redmond et al. |
| 9,322,247 B2 | 4/2016 | Rojas et al. |
| 9,429,009 B2 | 8/2016 | Paulk et al. |
| 9,436,173 B2 | 9/2016 | Wang et al. |
| 9,528,364 B2 | 12/2016 | Samuel et al. |
| 9,593,567 B2 | 3/2017 | Pink et al. |
| 9,598,947 B2 | 3/2017 | Wang et al. |
| 9,784,089 B2 | 10/2017 | Boone et al. |
| 9,828,845 B2 | 11/2017 | Kpetehoto et al. |
| 9,933,919 B2 | 4/2018 | Raja et al. |
| 9,934,338 B2 | 4/2018 | Germain et al. |
| 10,049,474 B2 | 8/2018 | Germain et al. |
| 10,067,491 B2 | 9/2018 | Wingky et al. |
| 10,067,973 B2 | 9/2018 | Moore |
| 10,161,226 B2 | 12/2018 | Bagnaro |
| 10,198,159 B2 | 2/2019 | Ziegler et al. |
| 10,202,837 B2 | 2/2019 | Ng et al. |
| 10,209,400 B2 | 2/2019 | Bermudez Martinez et al. |
| 10,233,728 B2 | 3/2019 | Kristjansson et al. |
| 10,260,332 B2 | 4/2019 | Israel et al. |
| 10,273,752 B2 | 4/2019 | Mebane, III |
| 10,294,770 B2 | 5/2019 | Anghelescu et al. |
| 10,301,923 B2 | 5/2019 | Andresen et al. |
| 10,345,771 B2 | 7/2019 | Anno et al. |
| 10,392,918 B2 | 8/2019 | Harkless et al. |
| 10,400,586 B2 | 9/2019 | Bitter et al. |
| 10,422,188 B2 | 9/2019 | Zheng et al. |
| 2002/0195247 A1* | 12/2002 | Ciglenec .................. E21B 7/06 166/250.11 |
| 2008/0173480 A1* | 7/2008 | Annaiyappa ............ E21B 15/00 175/24 |
| 2009/0194332 A1* | 8/2009 | Pastusek .................. E21B 21/08 175/40 |
| 2011/0264429 A1 | 10/2011 | Lee et al. |
| 2012/0026002 A1* | 2/2012 | Vu .......................... E21B 47/00 340/854.6 |
| 2012/0278268 A1* | 11/2012 | Hamalainen ........ G06F 16/9535 706/46 |
| 2015/0241871 A1 | 8/2015 | Yoshino et al. |
| 2017/0159372 A1 | 6/2017 | Zheng et al. |
| 2017/0295026 A1* | 10/2017 | Guilley .................... G09C 1/00 |
| 2017/0331901 A1* | 11/2017 | Sarlandie de la Robertie ............ H04W 12/08 |
| 2018/0152319 A1 | 5/2018 | Rojas et al. |
| 2018/0156023 A1 | 6/2018 | Dykstra et al. |
| 2018/0328159 A1 | 11/2018 | Mandava et al. |
| 2018/0334887 A1 | 11/2018 | Dashevskiy et al. |
| 2019/0033845 A1 | 1/2019 | Cella et al. |
| 2020/0102795 A1 | 4/2020 | Zheng et al. |

* cited by examiner

RELATIONSHIP TAGGING OF DATA IN WELL CONSTRUCTION

BACKGROUND OF THE DISCLOSURE

In the drilling of oil and gas wells, drilling rigs are used to create a well by drilling a wellbore through one or more formations to reach oil and gas deposits. During the drilling process, as the depth of the wellbore increases, so does the length and weight of the drillstring. A drillstring may include sections of drill pipe, a bottom hole assembly, and other tools for creating a well. The length of the drillstring may be increased by adding additional sections of drill pipe as the depth of the wellbore increases. Various components of a drilling rig can be used to advance the drillstring into the one or more formations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a processing system having a processor and a memory including computer program code. The processing system is operable to receive captured data of a data source attached with an expression of a relationship between the data source and a well construction system. The processing system is also operable to match the expression of the relationship between the data source and the well construction system with an expression in a relationship descriptor. The relationship descriptor includes a description of a physical layout of equipment and components of the well construction system. The relationship descriptor also includes respective expressions of relationships between data sources and locations, equipment, components, or a combination thereof of the well construction system. The expression in the relationship descriptor is one of the respective expressions. The processing system is also operable to determine secondary information based on the captured data and the matched expression in the relationship descriptor.

The present disclosure also introduces an apparatus including a processing system having a processor and a memory including computer program code. The processing system is operable to receive captured data of a data source at an input port of the processing system. The input port is mapped with an expression of a relationship between the data source and a location, equipment, a component, or a combination thereof of a well construction system. The processing system is also operable to attach the expression to the captured data, and to transmit the captured data and the attached expression to a network connection.

The present disclosure also introduces an apparatus including a system that includes a data acquisition unit, an application unit, and a network communicatively coupling the data acquisition unit and the application unit. The data acquisition unit includes a processor and a memory including computer program code. The data acquisition unit is operable to receive captured data of a data source at an input port of the data acquisition unit. The input port is mapped with a source expression of a relationship between the data source and a location, equipment, a component, or a combination thereof of a well construction system. The data acquisition unit is also operable to attach the source expression to the captured data, and to transmit the captured data and the attached source expression into the network. The application unit includes a processor and a memory including computer program code. The application unit is operable to receive the captured data and the attached source expression from the network. The application unit is also operable to match the source expression with a descriptor expression in a relationship descriptor. The relationship descriptor includes a description of a physical layout of equipment and components of the well construction system, and respective descriptor expressions of relationships between data sources and locations, equipment, components, or a combination thereof of the well construction system. The descriptor expression in the relationship descriptor is one of the respective descriptor expressions. The application unit is also operable to determine derivative information based on the captured data and the matched descriptor expression in the relationship descriptor.

The present disclosure also introduces a method including operating a processing system comprising a processor and a memory including computer program code. Operating the processing system includes receiving captured data of a data source attached with an expression of a relationship between the data source and a well construction system. Operating the processing system also includes matching the expression of the relationship between the data source and the well construction system with an expression in a relationship descriptor. The relationship descriptor includes a description of a physical layout of equipment and components of the well construction system, and respective expressions of relationships between data sources and locations, equipment, components, or a combination thereof of the well construction system. The expression in the relationship descriptor is one of the respective expressions. Operating the processing system also includes determining secondary information based on the captured data and the matched expression in the relationship descriptor.

The present disclosure also introduces a method including operating a processing system comprising a processor and a memory including computer program code, in which operating the processing system includes receiving captured data of a data source at an input port of the processing system, the input port being mapped with an expression of a relationship between the data source and a location, equipment, a component, or a combination thereof of a well construction system. Operating the processing system also includes attaching the expression to the captured data, and transmitting the captured data and the attached expression to a network connection.

The present disclosure also introduces a method including, via a data acquisition unit, attaching a source expression to captured data of a data source and transmitting the captured data and the attached source expression into a network. The source expression indicates a relationship between the data source and a location, equipment, a component, or a combination thereof of a well construction system. The method also comprises, via an application unit, receiving the captured data and the attached source expression from the network and matching the source expression with a descriptor expression in a relationship descriptor. The relationship descriptor includes a description of a physical layout of equipment and components of the well construction system, and respective descriptor expressions of relationships between data sources and locations, equipment, components, or a combination thereof of the well construction system. The descriptor expression in the relationship descriptor is one of the respective descriptor expressions.

The method also comprises, via the application unit, determining derivative information based on the captured data and the matched descriptor expression in the relationship descriptor.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Systems and methods and/or processes according to one or more aspects of the present disclosure may be used or performed in connection with well construction operations, such as at a well site for constructing a well to obtain hydrocarbons (e.g., oil and/or gas) from a formation. For example, some aspects may be described in the context of drilling a wellbore in the oil and gas industry. One or more aspects of the present disclosure may be applied in other contexts, such as for any construction operations and/or monitoring of any system.

One or more aspect of the present disclosure may permit simpler deployment of applications for, e.g., monitoring and logging data, optimizing operations, verifying and validating data, and/or providing security, among other examples. A relationship descriptor, in some examples, includes a digital description of the well construction system, including a physical layout of equipment and components of the well construction system, and one or more expressions of a relationship between a data source and a location, equipment, component or combination thereof of a well construction system. Input ports of a data acquisition unit can be mapped using the expressions of the relationship descriptor, and when data, such as measurement values or discrete indications, are received on the ports, the expression mapped to the port at which the data was received is attached to the data, which may be by using a data packet in some examples. The data and expression can then be transmitted from the data acquisition unit across a network, for example, to an application unit. The application unit operates a software application that uses the relationship descriptor. The software application can use the relationship descriptor to identify a source of the data from the expression that is received, and can use the data to derive other properties of the well construction system. Using the relationship descriptor can permit an application developer to create the software application without knowing the physical wiring and connection of data sources in the well construction system, for example.

Figure 1:
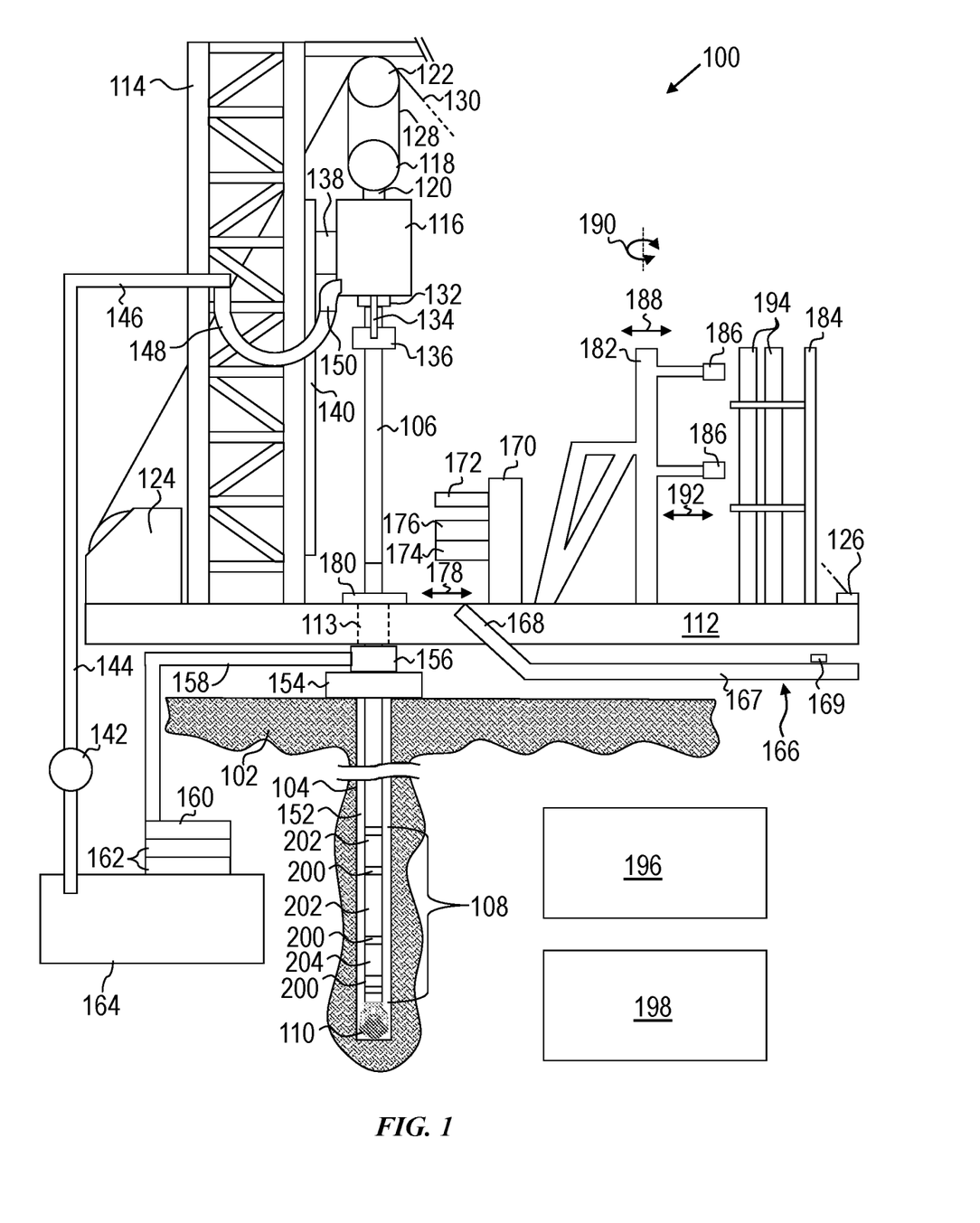
FIG. 1 is a schematic view of at least a portion of an example implementation of apparatus according to one or more aspects of the present disclosure.

FIG. 1 is a schematic view of at least a portion of an example implementation of a well construction system 100 operable to drill a wellbore 104 into one or more subsurface formations 102 at a well site in accordance with one or more aspects of the present disclosure. A drillstring 106 penetrates the wellbore 104 and includes a bottom hole assembly (BHA) 108 that comprises or is mechanically and hydraulically coupled to a drill bit 110. The well construction system 100 includes a mast 114 (at least a portion of which is depicted in FIG. 1) extending from a rig floor 112 that is erected over the wellbore 104. A top drive 116 is suspended from the mast 114 and is mechanically coupled to the drillstring 106. The top drive 116 provides a rotational force to drive rotational movement of the drillstring 106, such as to advance the drillstring 106 into the one or more subsurface formations 102 to form the wellbore 104.

The top drive 116 is suspended from the mast 114 via hoisting equipment. The hoisting equipment includes a traveling block 118 with a hook 120, a crown block 122, a drawworks 124, a deadline anchor 126, a supply reel (not depicted), and a drill line 128 with a deadline 130 (a portion of which is shown in phantom). The hook 120 of the traveling block 118 mechanically couples with the top drive 116, although other means for coupling the traveling block 118 with the top drive 116 are also within the scope of the present disclosure. The crown block 122 is suspended from, coupled with, and/or otherwise supported by the mast 114.

The drawworks 124 and the deadline anchor 126 are on and supported by the rig floor 112. The drill line 128 is supplied from the supply reel through the deadline anchor 126. The drill line 128 may be wrapped around and clamped at the deadline anchor 126 such that the drill line 128 that extends from the deadline anchor 126 to the crown block 122 is stationary during normal drilling operations, and hence, the portion of the drill line 128 that extends from the deadline anchor 126 to the crown block 122 is referred to as the deadline 130.

The crown block 122 and traveling block 118 comprise one or more pulleys or sheaves. The drill line 128 is reeved around the pulleys or sheaves of the crown block 122 and the traveling block 118. The drill line 128 extends from the crown block 122 to the drawworks 124. The drawworks 124 can comprise a drum, a prime mover (e.g., an engine or motor), a control system, and one or more brakes, such as a mechanical brake (e.g., a disk brake), an electrodynamic brake, and/or the like. The prime mover of the drawworks 124 drives the drum to rotate and reel in drill line 128, which in turn causes the traveling block 118 and top drive 116 to move upward. The drawworks 124 can reel out drill line 128 by a controlled rotation of the drum using the prime mover and control system, and/or by disengaging the prime mover (such as with a clutch) and disengaging and/or operating one or more brakes to control the release of the drill line 128. By unreeling drill line 128 from the drawworks 124, the traveling block 118 and top drive 116 may move downward.

Implementations within the scope of the present disclosure include land-based rigs, as depicted in FIG. 1, as well as offshore implementations. In offshore implementations, the hoisting equipment may also include a motion or heave compensator between the mast 114 and the crown block 122 and/or between the traveling block 118 and the hook 120, for example.

The top drive 116 includes a drive shaft 132, a pipe handling assembly 134 with an elevator 136, and various other components not shown in FIG. 1, such as a prime mover and a grabber. The drillstring 106 is mechanically coupled to the drive shaft 132 (e.g., with or without a sub saver between the drillstring 106 and the drive shaft 132). The prime mover drives the drive shaft 132, such as through a gearbox or transmission, to rotate the drive shaft 132 and, therefore, the drillstring 106, such as to facilitate the advancement of the drillstring 106 into the one or more subsurface formations 102 to form the wellbore 104. The pipe handling assembly 134 and elevator 136 permit the top drive 116 to handle tubulars (e.g., single, double, or triple stands of drill pipe and/or casing) that are not mechanically coupled to the drive shaft 132. The grabber includes a clamp that clamps onto a tubular when making up and/or breaking out a connection of a tubular with the drive shaft 132. A guide system (e.g., rollers, rack-and-pinion elements, and/or other mechanisms) includes a guide 140, affixed or integral to the mast 114, and a dolly 138 integral to or otherwise carried with the top drive 116 up and down the guide 140. The guide system may provide torque reaction, such as to prevent rotation of the top drive 116 while the prime mover is rotating the drive shaft 132. The guide system may also or instead aid in maintaining alignment of the top drive 116 with an opening 113 in the rig floor 112 through which the drillstring 106 extends.

A drilling fluid circulation system circulates oil-based mud (OBM), water-based mud (WBM), and/or other drilling fluid to the drill bit 110. A pump 142 delivers drilling fluid through, for example, a discharge line 144, a standpipe 146, and a rotary hose 148, to a port 150 of the top drive 116. The drilling fluid is then conducted through the drillstring 106 to the drill bit 110, exiting into the wellbore 104 via ports in the drill bit 110. The drilling fluid then circulates upward through an annulus 152 defined between the outside of the drillstring 106 and the wall of the wellbore 104. In this manner, the drilling fluid lubricates the drill bit 110 and carries formation cuttings up to the surface as the drilling fluid is circulated.

At the surface, the drilling fluid may be processed for recirculation. For example, the drilling fluid may flow through a blowout preventer 154 and a bell nipple 156 that diverts the drilling fluid to a return flowline 158. The return flowline 158 may direct the drilling fluid to a shale shaker 160 that removes at least large formation cuttings from the drilling fluid. The drilling fluid may then be directed to reconditioning equipment 162, such as may remove gas and/or finer formation cuttings from the drilling fluid. The reconditioning equipment 162 can include a desilter, a desander, a degasser, and/or other components.

After treatment by the reconditioning equipment 162, the drilling fluid may be conveyed to one or more mud tanks 164. Intermediate mud tanks may also be used to hold drilling fluid before and/or after the shale shaker 160 and/or various ones of the reconditioning equipment 162. The mud tank(s) 164 can include an agitator to assist in maintaining uniformity (e.g., homogeneity) of the drilling fluid contained therein. A hopper (not depicted) may be disposed in a flowline between the mud tank(s) 164 and the pump 142 to disperse an additive, such as caustic soda, in the drilling fluid.

A catwalk 166 can be used to convey tubulars from a ground level to the rig floor 112. The catwalk 166 has a horizontal portion 167 and an inclined portion 168 that extends between the horizontal portion 167 and the rig floor 112. A skate 169 may be positioned in a groove and/or other alignment means in the horizontal and inclined portions of the catwalk 166. The skate 169 can be driven along the groove by a rope, chain, belt, and/or other pulley system (not depicted), thereby pushing tubulars up the inclined portion 168 of the catwalk 166 to a position at or near the rig floor 112 for subsequent engagement by the elevator 136 of the top drive 116 and/or other pipe handling means. However, other means for transporting tubulars from the ground to the rig floor 112 are also within the scope of the present disclosure. One or more pipe racks may also adjoin the horizontal portion 167 of the catwalk 166, and may have a tubular delivery unit and/or other means for transferring tubulars to the horizontal portion 167 of the catwalk 166 in a mechanized and/or automated manner.

An iron roughneck 170 is also disposed on the rig floor 112. The iron roughneck 170 comprises a spinning system 172 and a torque wrench comprising a lower gripper 174 and an upper gripper 176. The iron roughneck 170 is moveable (e.g., in a translation movement 178) to approach the drillstring 106 (e.g., for making up and/or breaking out a connection of the drillstring 106) and to move clear of the drillstring 106. The spinning system 172 applies low-torque spinning to engage or disengage a threaded connection between tubulars of the drillstring 106, and the torque wrench applies a higher torque to ultimately make up or initially break out the threaded connection.

Manual, mechanized, and/or automated slips 180 are also disposed on and/or in the rig floor 112. The drillstring 106 extends through the slips 180. In mechanized and/or automated implementations of the slips 180, the slips 180 can be actuated between open and closed positions. In the open position, the slips 180 permit advancement of the drillstring 106 through the slips 180. In the closed position, the slips 180 clamp the drillstring 106 to prevent advancement of the drillstring 106, including with sufficient force to support the weight of the drillstring 106 suspended in the wellbore 104.

To form the wellbore 104 (e.g., "make hole"), the hoisting equipment lowers the top drive 116, and thus the drillstring 106 suspended from the top drive 116, while the top drive 116 rotates the drillstring 106. During this advancement of the drillstring 106, the slips 180 are in the open position, and the iron roughneck 170 is clear of the drillstring 106. When the upper end of the tubular in the drillstring 106 that is made up to the top drive 116 nears the slips 180, the hoisting equipment ceases downward movement of the top drive 116, the top drive 116 ceases rotating the drillstring 106, and the slips 180 close to clamp the drillstring 106. The grabber of the top drive 116 clamps the upper portion of the tubular made up to the drive shaft 132. The drive shaft 132 is driven via operation of the prime mover of the top drive 116 to break out the connection between the drive shaft 132 and the drillstring 106. The grabber of the top drive 116 then releases the tubular of the drillstring 106, and the hoisting equipment raises the top drive 116 clear of the "stump" of the drillstring 106 extending upward from the slips 180.

The elevator 136 of the top drive 116 is then pivoted away from the drillstring 106 towards another tubular extending up through the rig floor 112 via operation of the catwalk 166. The elevator 136 and the hoisting mechanism are then operated to grasp the additional tubular with the elevator 136. The hoisting equipment then raises the additional tubular, and the elevator 136 and the hoisting equipment are then operated to align and lower the bottom end of the additional tubular to proximate the upper end of the stump.

The iron roughneck 170 is moved 178 toward the drillstring 106, and the lower gripper 174 clamps onto the stump of the drillstring 106. The spinning system 172 then rotates the suspended tubular to engage a threaded (e.g., male) connector with a threaded (e.g., female) connector at the top end of the stump. Such spinning continues until achieving a predetermined torque, number of spins, vertical displacement of the additional tubular relative to the stump, and/or other operational parameters. The upper gripper 176 then clamps onto and rotates the additional tubular with a higher torque sufficient to complete making up the connection with the stump. In this manner, the additional tubular becomes part of the drillstring 106. The iron roughneck 170 then releases the drillstring 106 and is moved 178 clear of the drillstring 106.

The grabber of the top drive 116 then grasps the drillstring 106 proximate the upper end of the drillstring 106. The drive shaft 132 is moved into contact with the upper end of the drillstring 106 and is rotated via operation of the prime mover to make up a connection between the drillstring 106 and the drive shaft 132. The grabber then releases the drillstring 106, and the slips 180 are moved into the open position. Drilling may then resume.

FIG. 1 also depicts a pipe handling manipulator (PHM) 182 and a fingerboard 184 disposed on the rig floor 112, although other implementations within the scope of the present disclosure may include one or both of the PHM 182 and the fingerboard 184 located elsewhere or excluded. The fingerboard 184 provides storage (e.g., temporary storage) of tubulars 194, such that the PHM 182 can be operated to transfer the tubulars 194 from the fingerboard 184 for inclusion in the drillstring 106 during drilling or tripping-in operations, instead of (or in addition to) from the catwalk 166, and similarly for transferring tubulars 194 removed from the drillstring 106 to the fingerboard 184 during tripping-out operations.

The PHM 182 includes arms and clamps 186 collectively operable for grasping and clamping onto a tubular 194 while the PHM 182 transfers the tubular 194 to and from the drillstring 106, the fingerboard 184, and the catwalk 166. The PHM 182 is movable in at least one translation direction 188 and/or a rotational direction 190 around an axis of the PHM 182. The arms of the PHM 182 can extend and retract along direction 192.

The tubulars 194 conveyed to the rig floor 112 via the catwalk 166 (such as for subsequent transfer by the elevator 136 and/or the PHM 182 to the drillstring 106 and/or the fingerboard 184) may be single joints and/or double- or triple-joint stands assembled prior to being fed onto the catwalk 166. In other implementations, the catwalk 166 may include means for making/breaking the multi-joint stands.

The multi joint stands may also be made up and/or broken out via cooperative operation of two or more of the top drive 116, the drawworks 124, the elevator 136, the catwalk 166, the iron roughneck 170, the slips 180, and the PHM 182. For example, the catwalk 166 may position a first joint (drill pipe, casing, etc.) to extend above the rig floor 112 or another orientation where the joint can be grasped by the elevator 136. The top drive 116, the drawworks 124, and the elevator 136 may then cooperatively transfer the first joint into the wellbore 104, where the slips 180 may retain the first joint. The catwalk 166 may then position a second joint that will be made up with the first joint. The top drive 116, the drawworks 124, and the elevator 136 may then cooperatively transfer the second joint to proximate the upper end of the first joint extending up from the slips 180. The iron roughneck 170 may then make up the first and second joints to form a double stand. The top drive 116, the drawworks 124, the elevator 136, and the slips 180 may then cooperatively move the double stand deeper into the wellbore 104, and the slips 180 may retain the double stand such that an upper end of the second joint extends upward. If the contemplated drilling, casing, or other operations are to utilize triple stands, the catwalk 166 may then position a third joint to extend above the rig floor 112, and the top drive 116, the drawworks 124, and the elevator 136 may then cooperatively transfer the third joint to proximate the upper end of the second joint extending up from the slips 180. The iron roughneck 170 may then make up the second and third joints to form a triple stand. The top drive 116 (or the elevator 136) and the drawworks 124 may then cooperatively lift the double or triple stand out of the wellbore 104. The PHM 182 may then transfer the stand from the top drive 116 (or the elevator 136) to the fingerboard 184, where the stand may be stored until retrieved by the PHM 182 for the drilling, casing, and/or other operations. This process of assembling stands may generally be performed in reverse to disassemble the stands.

A power distribution center 196 is also at the well site. The power distribution center 196 includes one or more generators, one or more AC-to-DC power converters, one or more DC-to-AC power inverters, one or more hydraulic systems, one or more pneumatic systems, the like, or a combination thereof. The power distribution center 196 can distribute AC and/or DC electrical power to various motors, pumps, or the like that are throughout the well construction system 100. Similarly, the power distribution center 196 can distribute pneumatic and/or hydraulic power throughout the well construction system 100. Components of the power distribution center 196 can be centralized in the well construction system 100 or can be distributed throughout the well construction system 100.

A control center 198 is also at the well site. The control center 198 houses one or more processing systems of a network of the well construction system 100. Details of the network of the well construction system 100 are described below. Generally, various equipment of the well construction system 100, such as the drilling fluid circulation system, the hoisting equipment, the top drive 116, the PHM 182, the catwalk 166, etc., can have various sensors and controllers to monitor and control the operations of that equipment. Additionally, the control center 198 can receive information regarding the formation and/or downhole conditions from modules and/or components of the BHA 108.

The BHA 108 can comprise various components with various capabilities, such as measuring, processing, and storing information. A telemetry device can be in the BHA 108 to enable communications with the control center 198. The BHA 108 shown in FIG. 1 is depicted as having a modular construction with specific components in certain modules. However, the BHA 108 may be unitary or select portions thereof may be modular. The modules and/or the components therein may be positioned in a variety of configurations throughout the BHA 108. The BHA 108 may comprise a measurement while drilling (MWD) module 200 that may include tools operable to measure wellbore trajectory, wellbore temperature, wellbore pressure, and/or other example properties. The BHA 108 may comprise a sampling while drilling (SWD) system comprising a sample module 202 for communicating a formation fluid through the BHA 108 and obtaining a sample of the formation fluid. The SWD system may comprise gauges, sensor, monitors and/or other devices that may also be utilized for downhole sampling and/or testing of a formation fluid. The BHA 108 may comprise a logging while drilling (LWD) module 204 that may include tools operable to measure formation parameters and/or fluid properties, such as resistivity, porosity, permeability, sonic velocity, optical density, pressure, temperature, and/or other example properties.

A person having ordinary skill in the art will readily understand that a drilling system may include more or fewer equipment than as described herein and/or depicted in the figures. Additionally, various equipment and/or systems of the example implementation of the well construction system 100 depicted in FIG. 1 may include more or fewer equipment. For example, various engines, motors, hydraulics, actuators, valves, or the like that were not described above and/or depicted in FIG. 1 may be included in other implementations of equipment and/or systems also within the scope of the present disclosure.

Additionally, the well construction system 100 of FIG. 1 may be implemented as a land-based rig or on an offshore rig. One or more aspects of the well construction system 100 of FIG. 1 may be incorporated in and/or omitted from a land-based rig or an offshore rig. Such modifications are within the scope of the present disclosure.

Even further, one or more equipment and/or systems of the well construction system 100 of FIG. 1 may be transferable via a land-based movable unit, such as a truck and/or trailer. As examples, each of the following equipment and/or systems may be transferable by a separate truck and trailer combination: the mast 114, the PHM 182 (and associated frame), the drawworks 124, the fingerboard 184, the power distribution center 196, the control center 198, and mud tanks 164 (and associated pump 142, shale shaker 160, and reconditioning equipment 162), the catwalk 166, etc. Some of the equipment and/or systems may be collapsible to accommodate transfer on a trailer. For example, the mast 114, the fingerboard 184, the catwalk 166, and/or other equipment and/or systems may be telescopic, folding, and/or otherwise collapsible. Other equipment and/or systems may be collapsible by other techniques, or may be separable into subcomponents for transportation purposes.

Figure 2:
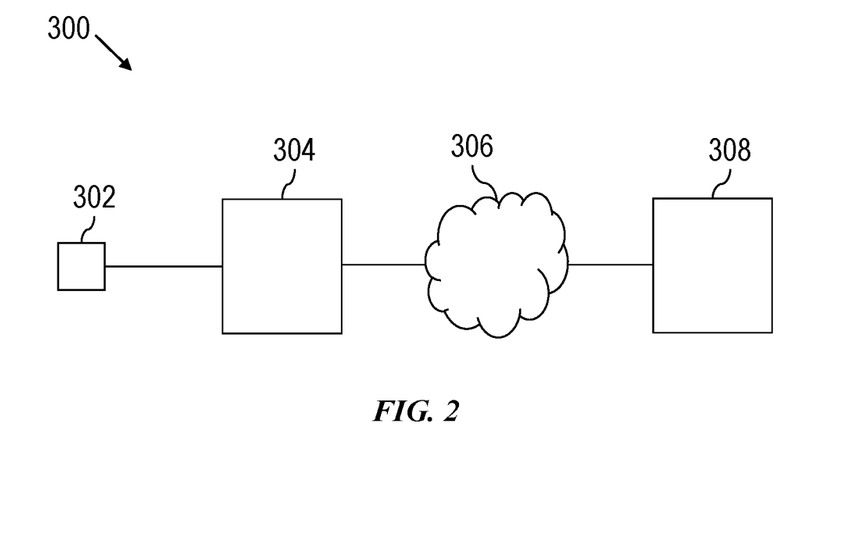
FIG. 2 is a schematic view of at least a portion of an example implementation of apparatus according to one or more aspects of the present disclosure.

FIG. 2 is a schematic view of at least a portion of an example, simplified implementation of a system 300 at a well site in accordance with the present disclosure. The system 300 includes a data source 302 on a well construction system, a data acquisition unit 304, a local area network (LAN) 306, and an application unit 308. The data source 302 can be a sensor, an actuator, or a combination thereof. The data source 302 generates data relating to some aspect of the well construction system. For example, a sensor can be a pressure gauge that generates data relating to pressure of a fluid in, e.g., a pipe. Other example sensors can include a force gauge, a tachometer, an electrical current sensor, a voltage sensor, and others. Example actuators include an open/close mechanism of a valve, an on/off switch of a motor, and others. The data acquisition unit 304 captures data that the data source 302 generates and, possibly, other data generated by the data acquisition unit 304. Some examples of captured data can include a value of a measurement, a quality of the measurement, a frequency of sampling, a unit of a measurement, a time of calibration, etc. The data acquisition unit 304 can be a programmable logic controller, an industrial computer, another processing system suitable for the application, or the like. The data acquisition unit 304 can, for example, control an actuator when the data source 302 is the actuator. The data acquisition unit 304 transmits the data generated by the data source 302 across the LAN 306, and the data is received by the application unit 308. The LAN 306 can be in any topology and can be implemented by any devices and communication protocols. The application unit 308 can be a user computer such as a desktop computer, a laptop, a tablet, a mobile device, or the like; an industrial computer; another processing system suitable for the application; or the like. Additional details of operations of the data acquisition unit 304 and the application unit 308 are described below.

The following methods or processes may permit intelligent use, in a software application, of data generated by data sources on a well construction system. The methods or processes are described in the context of devices and components described above, although in other implementations, methods or processes within the scope of this disclosure may be performed in the context of other devices and components. The methods or processes described below are presented in a given order, although other implementations also within the scope of the present disclosure may comprise the described and/or other methods or processes in other orders and/or in parallel. Various other modifications to the methods or processes described below may also be consistent with the scope of the present disclosure. For example, such implementations may include additional or fewer calculations, determinations, computations, logic, and/or other aspects.

Figure 3:
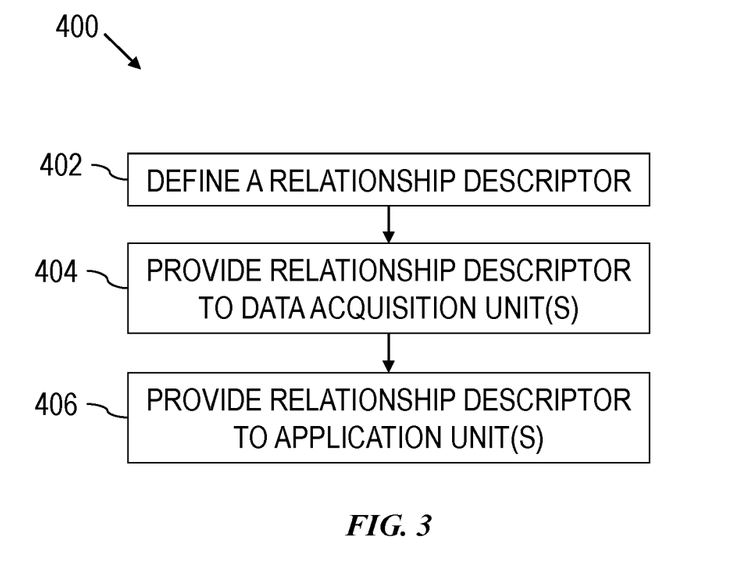
FIG. 3 is a flow-chart diagram of at least a portion of an example implementation of a method according to one or more aspects of the present disclosure.

FIG. 3 is a flow-chart diagram of at least a portion of an example implementation of a method (400) for distributing a relationship descriptor according to one or more aspects of the present disclosure. The method (400) includes defining (402) the relationship descriptor. The relationship descriptor includes a digital description of the well construction system, including a physical layout of equipment and components of the well construction system, such as the drawworks, drill line, crown block, traveling block, top drive, deadline anchor, drilling fluid (e.g., mud) pumps, pulsation damper, pipes and connectors that transfer and convey drilling fluid, mud tanks, etc. The relationship descriptor can indicate how equipment and components are related to and/or affect each other. The relationship descriptor, in some examples, further includes one or more expressions of a relationship between a data source, such as a sensor or an actuator, and a location, equipment, component, or a combination thereof of a well construction system. The relationship in the relationship descriptor can be relative to given equipment or component and/or can be at a fixed location according to the physical layout of the well construction system. An example relationship that is relative to given equipment might be that a specified sensor is located between the top drive and the travelling block of the well construction system, which sensor, traveling block, and top drive may be moveable during operations of the well construction system. Other sensors may be in fixed (e.g., immoveable during construction operations) locations on the well construction system. For example, a pressure sensor may be placed at the standpipe manifold. The relationship descriptor can be a data structure in a flat file, information stored in a database, or the like.

The method (400) includes providing (404) the relationship descriptor to one or more data acquisition units. An expression of a relationship between a data source and a location, equipment, and/or component of the well construction system can be mapped to an input or output port of a data acquisition unit using the relationship descriptor. The data source is then communicatively coupled to the mapped port of the data acquisition unit. A data acquisition unit can have multiple input and/or output ports mapped to different data sources, which ports may be communicatively coupled to the respective data sources.

The method (400) further comprises providing (406) the relationship descriptor to one or more application units. An application unit can operate a software application for monitoring, logging, and/or controlling operations of the well construction system, for example. The software application can use the relationship descriptor to determine sources of received data and to intuitively interpret the received data, as described in further detail below.

Figure 4:
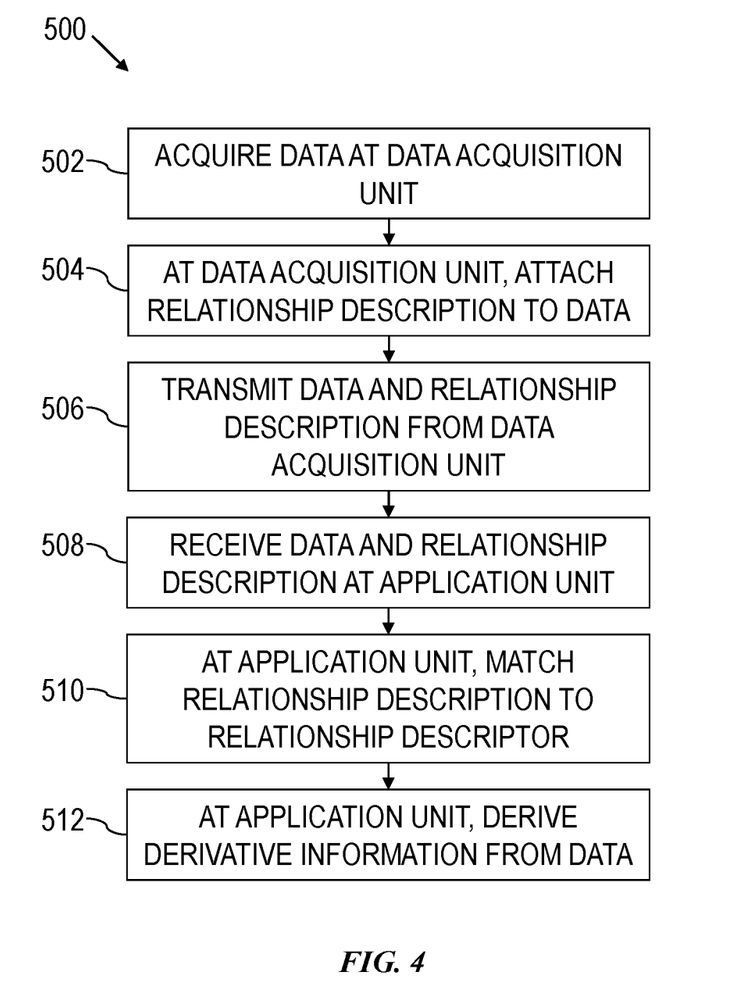
FIG. 4 is a flow-chart diagram of at least a portion of an example implementation of a method according to one or more aspects of the present disclosure.

FIG. 4 is a flow-chart diagram of at least a portion of an example implementation of a method (500) for using a relationship descriptor according to one or more aspects of the present disclosure. The method (500) includes acquiring (502) data at a data acquisition unit. The data, in some examples, is generated and transmitted by a data source, such as a sensor and/or actuator, and is received by the data acquisition unit. In some examples, the data source is communicatively coupled to an input port of the data acquisition unit, which port receives the data. The data generated by the data source can be captured data including measurement values of a sensor (e.g., transducer), discrete indications (e.g., on/off, open/closed, etc.) of an actuator, or the like. Example data provided by a sensor includes a pressure measurement, a force measurement, a number of revolutions, etc., and example data provided by an actuator includes an on/off indication, an open/closed indication, etc.

The method (500) comprises, at the data acquisition unit, attaching (504) a relationship description to the data. As described above with respect to the method (400) of FIG. 3, the input port of the data acquisition unit can be mapped with an expression of a relationship between the data source and a location, equipment, and/or component of the well construction system. When data is received on the mapped input port, the received data and/or other captured data is attached to the expression of the mapped input port at which the data was received, which is the relationship description. The received and/or other captured data and relationship description can be attached by packaging the received and/or other captured data and relationship description together in a data packet and/or other technique. When a data packet is used, the data packet can include other information. For example, the data packet can include quality information. The quality information can indicate a strength of the signal received at the data acquisition unit and/or if a connection between the data source and data acquisition unit remains intact or becomes open. The quality information can indicate other quality factors.

The method (500) then includes transmitting (506) the data and the relationship description from the data acquisition unit and receiving (508) the data and the relationship description at an application unit. The transmission of the data and the relationship description between the data acquisition unit and the application unit can be through any network, such as a LAN at the well site, and by any devices and/or communication protocols.

The method (500) comprises, at the application unit, matching (510) the relationship description to the relationship descriptor. As described above with respect to the method (400) of FIG. 3, the relationship descriptor is provided to the application unit, and the application unit operates one or more software applications that uses the relationship descriptor. A software application on the application unit matches the relationship description to an expression in the relationship descriptor. By matching the relationship description and the expression in the relationship descriptor, the software application can determine the data source and the meaning or context of the data that has been received. The software application can reformat and/or store the data in memory for subsequent use, for example.

The method (500) also includes, at the application unit, deriving (512) derivative information from the received data. The software application on the application unit, once it has matched the relationship description and the expression in the relationship descriptor, can use the data to determine derivative information about the well construction system. For example, based on the matched relationship description, the program can determine the location of the data source in the well construction system and can accordingly interpret the data, which can include calculations that are used to derive the derivative information, such as by compensating for physical properties of the well construction system and/or translating a measurement to other meaningful data. Further, with the relationship descriptor, the software application can determine properties and relationships among different data from different data sources that are received. For example, based on the physical layout of the relationship descriptor, the software application can determine an elevation change and direction of flow between sensors along a given pipe or flow line. This information can be used in determining the derivative information. Some examples are described in more detail below. The derivative information can be used as a mechanism to verify data of different data sources, can be used to detect equipment and/or system level anomalies, and/or can be used as a security check against hacking into a network at the well site. In some examples, the data can be discarded if, for example, a quality indicator, such as when a data packet is used and includes the quality indicator, does not indicate sufficient quality, or the derivative information from other received data indicates a low quality for the data. In such a scenario, the software application may derive similar data from data from one or more other data sources. Hence, the application unit can, based on the received data and relationship description, monitor, diagnose, and/or infer physical behavior of various operations, such as drilling operations, of the well construction system.

Figure 5:
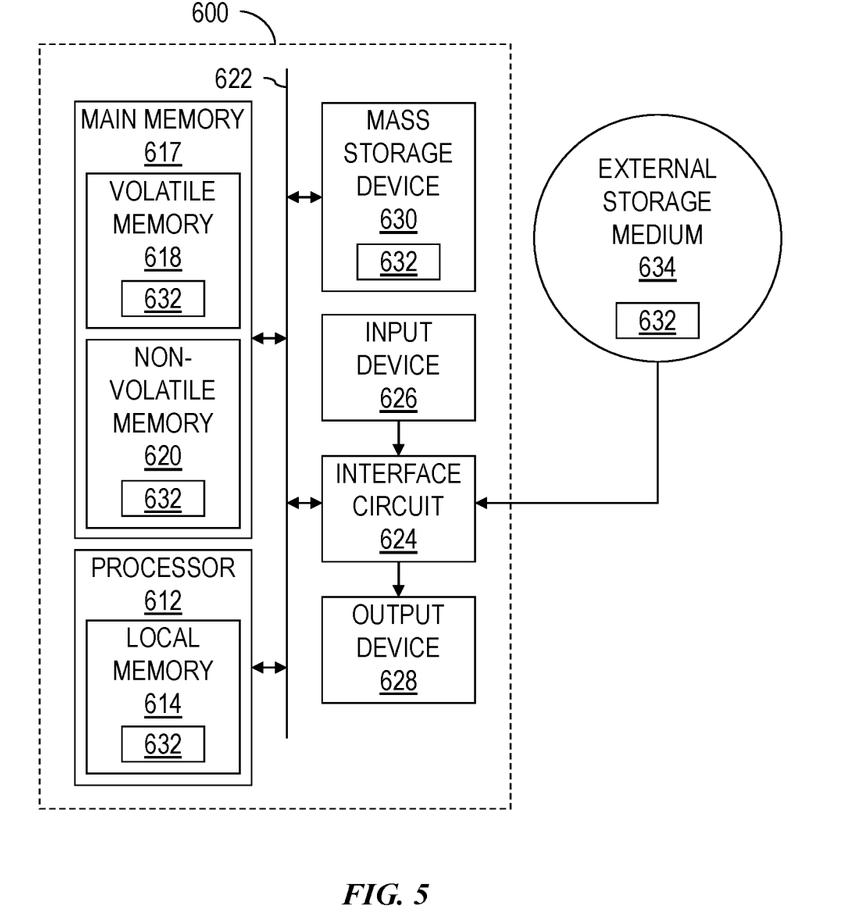
FIG. 5 is a schematic view of at least a portion of an example implementation of apparatus according to one or more aspects of the present disclosure.

FIG. 5 is a schematic view of at least a portion of an example implementation of a processing system 600 according to one or more aspects of the present disclosure. The processing system 600 may execute example machine-readable instructions to implement at least a portion of one or more of the methods and/or processes described herein.

The processing system 600 may be or comprise, for example, one or more processors, controllers, special-purpose computing devices, server devices, personal computers, personal digital assistant (PDA) devices, smartphones, network appliances, programmable logic controller (PLC), industrial computer, and/or other types of computing devices. In some examples, a processing system 600 can be implemented as a data acquisition unit, and another processing system 600 can be implemented as an application unit. The respective processing systems 600 of one or more data acquisition unit and one or more application unit can be housed in a control room at the well site, for example. Various processing systems 600 and functionalities of a data acquisition unit or an application unit can be in a single device or distributed across multiple devices.

The processing system 600 comprises a processor 612 such as, for example, a general-purpose programmable processor. The processor 612 may comprise a local memory 614, and may execute program code instructions 632 present in the local memory 614 and/or in another memory device. The processor 612 may execute, among other things, machine-readable instructions or programs to implement the methods and/or processes described herein. The programs stored in the local memory 614 may include program instructions or computer program code that, when executed by an associated processor, enable functionality of a data acquisition unit or application unit as described herein. The processor 612 may be, comprise, or be implemented by one or more processors of various types operable in the local application environment, and may include one or more general purpose processors, special-purpose processors, microprocessors, digital signal processors (DSPs), field-programmable gate arrays (FPGAs), application-specific integrated circuits (ASICs), processors based on a multi-core processor architecture, and/or other processors. More particularly, examples of a processor 612 include one or more INTEL microprocessors, microcontrollers from the ARM and/or PICO families of microcontrollers, embedded soft/hard processors in one or more FPGAs, etc.

The processor 612 may be in communication with a main memory 617, such as via a bus 622 and/or other communication means. The main memory 617 may comprise a volatile memory 618 and a non-volatile memory 620. The volatile memory 618 may be, comprise, or be implemented by a tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 620 may be, comprise, or be implemented by a tangible, non-transitory storage medium, such as read-only memory, flash memory and/or other types of memory devices. One or more memory controllers (not shown) may control access to the volatile memory 618 and/or the non-volatile memory 620.

The processing system 600 may also comprise an interface circuit 624 connected and communicatively coupled to the bus 622. The interface circuit 624 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 624 may also comprise a graphics driver card. The interface circuit 624 may also comprise a communication device such as a modem or network interface card to facilitate exchange of data with external computing devices via a network, such as via Ethernet connection, digital subscriber line (DSL), telephone line, coaxial cable, cellular telephone system, and/or satellite, among other examples. The interface circuit 624 may further be, comprise, or be implemented by digital input (DI), analog input (AI), digital output (DO), and/or analog output (AO) circuits, such as when the processing system 600 is implemented as a data acquisition unit.

One or more input devices 626 may be connected to the interface circuit 624. One or more of the input devices 626 may permit a user to enter data and/or commands for utilization by the processor 612. Each input device 626 may be, comprise, or be implemented by a keyboard, a mouse, a touchscreen, a track-pad, a trackball, an image/code scanner, and/or a voice recognition system, among other examples.

One or more output devices 628 may also be connected to the interface circuit 624. One or more of the output device 628 may be, comprise, or be implemented by a display device, such as a liquid crystal display (LCD), a light-emitting diode (LED) display, and/or a cathode ray tube (CRT) display, among other examples. One or more of the output devices 628 may also or instead be, comprise, or be implemented by a printer, speaker, and/or other examples.

The processing system 600 may also comprise a mass storage device 630 for storing machine-readable instructions and data. The mass storage device 630 may be connected to the interface circuit 624, such as via the bus 622. The mass storage device 630 may be or comprise a tangible, non-transitory storage medium, such as a floppy disk drive, a hard disk drive, a compact disk (CD) drive, and/or digital versatile disk (DVD) drive, among other examples. The program code instructions 632 may be stored in the mass storage device 630, the volatile memory 618, the non-volatile memory 620, the local memory 614, and/or on a removable storage medium 634, such as a CD or DVD.

The modules and/or other components of the processing system 600 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

EXAMPLES

The relationship descriptor can be used to easily identify data sources that would provide the data with the highest quality, which can then be used to optimize and automate well construction operations, such as drilling. For example, if weight on bit (WOB) should be used to optimize rate of penetration (ROP), then a hook load measurement from a load cell closest to the top drive, e.g., below the top drive, may be a primary candidate for calculating and deriving WOB. Based on the derived WOB, a drilling operation can be altered to optimize the ROP. Also, if a pump output pressure should be optimized, a pressure measurement at the outlet of the pump may be a primary candidate for determining the output pressure. If a direct measurement of a property becomes unavailable, such as by a sensor becoming faulty, an application can use derivative information determined based on the relationship descriptor. For example, if the sensor measuring the pressure at the outlet of the pump fails, the application can identify a subsequent sensor along the flow of fluid from the pump, and can derive an estimated output pressure at the pump by using the data from the subsequent sensor and accounting for the environment of the flow from the output of the pump to the subsequent sensor, such as changes in elevation, temperature changes, flow cross sections, friction pressure loss, etc.

Use of the relationship descriptor can also permit cross validation of sensor and system performance. For example, if a first load cell is installed above the top drive to measure hook load, and a second load cell is installed at the deadline anchor, monitoring of the first and second load cells, based on their identification using the relationship descriptor, can yield an impact of mechanical friction within the hoisting system, such as friction along the drill line on the hook load measurement. In such an example, the measurements from the first and second hook loads should correlate, and if the measurements begin to deviate, the deviation could indicate that the first and/or second load cells are dysfunctional and/or that a problem exists along the path of the drill line. For example, a correlation factor can be initially determined from the measurements between the first and second hook loads, and a fault may be determined when the correlation factor exceeds a predetermined threshold.

Further, as an example, if a third load cell is installed below the top drive, comparing the measurements and/or derivative information (e.g., to account for the differing placements) from the first, second, and third load cells may indicate which of the measurements is appropriate for use. For example, a measurement value of one of the first, second, and third load cells can be validated by comparing derivative information of the others of the first, second, and third load cells, and the measurement value is validated when differences between the measurement value and the derivative information are within a predefined threshold. In using these load cell measurements as hook load for drilling automation, knowledge of a relationship descriptor may permit assigning relevancy of these measurements, such as in implementations in which the third load cell (e.g., below the top drive) may provide a more accurate measurement while the second load cell (e.g., at the deadline anchor) may provide a less accurate measurement.

Sensor data associated with a given piece of equipment could be used to derive information about the operational health and performance of that piece of equipment. For example, sensors on a top drive may have the following measurements: current (I), voltage (V), torque (T), and revolutions per minute (RPM). The input power $P_i$ may be calculated as $P_i=I*V$, and the output power $P_o$ may be calculated as $P_o=T*RPM$. Due to energy loss of the system (e.g., friction), the input power $P_i$ may not be equal to the output power $P_o$. However, a top drive should maintain a stable input power $P_i$ vs. output power $P_o$ relationship. By tracking the variation of input power $P_i$ vs. output power $P_o$ over time, one could identify a problem in the operational health of top drive over time. A problem may arise when the variation exceeds a predetermined amount over a defined period of time. An alarm may be generated when the problem is determined, and operations of the well construction system can be halted until the problem is addressed, or equipment maintenance may be scheduled to address the problem.

A monitoring scheme could also be used to identify any problem that results from a cyber security breach. Taking the example of the top drive again, if a cyber-attack occurs such that the top drive torque sensor value is manipulated, monitoring the torque value may not be able to detect a problem. However, by tracking the trend of input power $P_i$ vs. output power $P_o$, such an anomaly can be easily detected.

With the relationship descriptor and the tagging of sensor data with the relationship expression, a well construction subsystem can be easily monitored during operations. As an example, consider the drilling fluid circulation system. The flow path from an active mud tank to the stand pipe can be monitored by combining various measurements on the flow path. These measurements may include level sensors at the active mud tank, a flow rate at the intake of the mud pumps, a pressure at the outlet of the mud pumps, and one or more pressures at various locations along the piping line to the standpipe. By using fundamental physics principles, such as conservation of energy, mass, and momentum, one may evaluate the correlation of different measurements in the circulation system. For example, for any given flow rate, the pressure drop between any two points within the pipe conducting the drilling fluid may depend upon the pipe friction losses and a difference in elevation. Thus, correlating the outlet pressure at the mud pump and the pressure at the stand pipe and compensating for the pressure losses based on the position of the sensor and pipe friction losses can enable an inference of a blockage or leak within the two points of measurement. A problem may arise when the variation between the compensated pressure values in this example exceeds a predetermined amount. An alarm may be generated when the problem is determined, and operations of the well construction system can be halted until the problem is addressed.

A similar monitoring scheme can also be used to detect a problem as a result of a cyber security breach. For example, take the drilling fluid circulation system as an example again. If the measurement of the active tank level is compromised, a simple monitoring scheme within the scope of the present disclosure could detect such an issue by comparing the flow rate measured at the pump inlet with the mud tank volume change (e.g., using a tank level measurement). Other examples are also within the scope of the present disclosure.

As another example, a rate of capturing data at a sensor can be compared to a configuration setting in the system to identify a cyber security breach. For example, as part of the relationship descriptor and/or an application using the relationship descriptor, a configuration data rate can be predefined or set for a given sensor with its corresponding expression. Once the expression attached with the data is matched to an expression in the relationship descriptor, the capture rate of the data at the given sensor can be compared to the configuration data rate of the expression of the relationship descriptor and/or the application. If the capture rate and the configuration data rate do not match, a security alert can be generated.

The use of a relationship descriptor and the tagging of sensor data with the relationship expression according to one or more aspects of the present disclosure may permit plug-n-play deployment of one or more applications in the well construction system. Using information in the relationship descriptor, an application developer might not be limited by not knowing the physical wiring and connection of the data sources in the well construction system. This may permit distributed development and fast deployment of future-developed answer products, such as for monitoring, optimizing, automating, and/or troubleshooting the well construction system.

In view of the entirety of the present disclosure, including the figures and the claims, a person having ordinary skill in the art will readily recognize that the present disclosure introduces an apparatus comprising a processing system comprising a processor and a memory including computer program code, wherein the processing system is operable to: (A) receive captured data of a data source attached with an expression of a relationship between the data source and a well construction system; (B) match the expression of the relationship between the data source and the well construction system with an expression in a relationship descriptor, wherein the relationship descriptor comprises: (i) a description of a physical layout of equipment and components of the well construction system; and (ii) respective expressions of relationships between data sources and locations, equipment, components, or a combination thereof of the well construction system, wherein the expression in the relationship descriptor is one of the respective expressions; and (C) determine secondary information based on the captured data and the matched expression in the relationship descriptor.

The processing system may be operable to alter a construction operation based on the determined secondary information.

The processing system may be operable to schedule maintenance of equipment based on the determined secondary information.

The processing system may be operable to: receive multiple captured data of different data sources each attached with a respective expression of a relationship between the respective data source and the well construction system; match each respective expression of the relationship between the respective data source and the well construction system with an expression in the relationship descriptor; and determine one of the multiple captured data that is likely to be most reliable based on the matching.

The secondary information may be a correlation factor between the captured data and additional captured data of an additional data source, and the processing system may be operable to determine an occurrence of a fault in the well construction system based on the correlation factor exceeding a predefined threshold.

The processing system may be operable to validate additional captured data of an additional data source based on the secondary information, the validation may comprise comparing the additional captured data to the secondary information, and the additional captured data may be validated when a difference between the secondary information and the additional captured data is within a predefined threshold.

The processing system may be operable to: monitor an operational health of a piece of equipment of the well construction system by determining additional secondary information based on additional captured data from an additional data source, wherein the data source and the additional data source may be on the piece of equipment; determine problematic functionality of the piece of equipment based on a variation between the secondary information and the additional secondary information exceeding a predefined threshold over a predefined period of time; and signal an alert associated with the determined problematic functionality.

The processing system may be operable to: monitor an operation of a subsystem of the well construction system by determining additional secondary information based on additional captured data from an additional data source, wherein the data source and the additional data source may be at separate locations in the subsystem; determine problematic functionality of the subsystem based on a variation between the secondary information and the additional secondary information exceeding a predefined threshold; and signal an alert associated with the determined problematic functionality.

The processing system may be operable to: monitor security of the well construction system by determining additional secondary information based on additional captured data from an additional data source; determine a security breach based on a variation between the secondary information and the additional secondary information exceeding a predefined threshold; and signal an alert associated with the determined security breach.

The secondary information may include a matching indication, the matching indication may indicate whether a captured data rate of the captured data by the data source matches a configuration setting data rate for the matched expression, and the processing system may be operable to signal a security alert when the matching indication indicates that the captured data rate does not match the configuration setting data rate.

The captured data may be further attached with a quality indicator indicative of a quality of the captured data, and the processing system may be operable to: determine the secondary information when the quality indicator indicates a satisfactory quality; and update quality information of the captured data based on the secondary information obtained by other captured data.

The present disclosure also introduces an apparatus comprising a processing system comprising a processor and a memory including computer program code, wherein the processing system is operable to: receive captured data of a data source at an input port of the processing system, wherein the input port is mapped with an expression of a relationship between the data source and a location, equipment, a component, or a combination thereof of a well construction system; attach the expression to the captured data; and transmit the captured data and the attached expression to a network connection.

The data source may be a sensor and/or an actuator.

The processing system may be operable to attach a quality indicator to the captured data, and the quality indicator may indicate a quality of the received captured data.

The present disclosure also introduces an apparatus comprising a system that includes a data acquisition unit, an application unit, and a network communicatively coupling the data acquisition unit and the application unit. The data acquisition unit comprises a processor and a memory including computer program code. The data acquisition unit is operable to: receive captured data of a data source at an input port of the data acquisition unit, wherein the input port is mapped with a source expression of a relationship between the data source and a location, equipment, a component, or a combination thereof of a well construction system; attach the source expression to the captured data; and transmit the captured data and the attached source expression into the network. The application unit comprises a processor and a memory including computer program code. The application unit is operable to receive the captured data and the attached source expression from the network. The application unit is also operable to match the source expression with a descriptor expression in a relationship descriptor. The relationship descriptor comprises: a description of a physical layout of equipment and components of the well construction system; and respective descriptor expressions of relationships between data sources and locations, equipment, components, or a combination thereof of the well construction system, wherein the descriptor expression in the relationship descriptor is one of the respective descriptor expressions. The application unit is also operable to determine derivative information based on the captured data and the matched descriptor expression in the relationship descriptor.

The data source may be a sensor and/or an actuator.

The data acquisition unit may be operable to attach a quality indicator to the captured data, and the quality indicator may indicate a quality of the received captured data. In such implementations, among others within the scope of the present disclosure, the application unit may be operable to: determine the derivative information when the quality indicator indicates a satisfactory quality; and discard the captured data when the quality indicator indicates an unsatisfactory quality.

The application unit may be operable to alter a construction operation based on the determined derivative information.

The application unit may be operable to schedule maintenance of equipment based on the determined derivative information.

The application unit may be operable to: receive multiple captured data of different data sources each attached with a respective source expression of a relationship between the respective data source and a respective location, equipment, component, or combination thereof of the well construction system; match each respective source expression with a descriptor expression in the relationship descriptor; and determine one of the multiple captured data that is likely to be most reliable based on the matching.

The derivative information may be a correlation factor between the captured data and additional captured data of an additional data source, and the application unit may be operable to determine an occurrence of a fault in the well construction system based on the correlation factor exceeding a predefined threshold.

The application unit may be operable to validate additional captured data of an additional data source based on the derivative information by comparing the additional captured data to the derivative information, and the additional captured data may be validated when a difference between the derivative information and the additional captured data is within a predefined threshold.

The application unit may be operable to: monitor an operational health of a piece of equipment of the well construction system by determining additional derivative information based on additional captured data from an additional data source, wherein the data source and the additional data source may be on the piece of equipment; determine problematic functionality of the piece of equipment based on a variation between the derivative information and the additional derivative information exceeding a predefined threshold over a predefined period of time; and signal an alert associated with the determined problematic functionality.

The application unit may be operable to: monitor an operation of a subsystem of the well construction system by determining additional derivative information based on additional captured data from an additional data source, wherein the data source and the additional data source may be at separate locations in the subsystem; determine problematic functionality of the subsystem based on a variation between the derivative information and the additional derivative information exceeding a predefined threshold; and signal an alert associated with the determined problematic functionality.

The application unit may be operable to: monitor security of the well construction system by determining additional derivative information based on additional captured data from an additional data source; determine a security breach based on a variation between the derivative information and the additional derivative information exceeding a predefined threshold; and signal an alert associated with the determined security breach.

The derivative information may include a matching indication, the matching indication may indicate whether a captured data rate of the captured data by the data source matches a configuration setting data rate for the matched descriptor expression, and the application unit may be operable to signal a security alert when the matching indication indicates that the captured data rate does not match the configuration setting data rate.

The present disclosure also introduces a method comprising operating a processing system comprising a processor and a memory including computer program code, wherein operating the processing system comprises: (A) receiving captured data of a data source attached with an expression of a relationship between the data source and a well construction system; (B) matching the expression of the relationship between the data source and the well construction system with an expression in a relationship descriptor, wherein the relationship descriptor comprises: (i) a description of a physical layout of equipment and components of the well construction system; and (ii) respective expressions of relationships between data sources and locations, equipment, components, or a combination thereof of the well construction system, wherein the expression in the relationship descriptor is one of the respective expressions; and (C) determining secondary information based on the captured data and the matched expression in the relationship descriptor.

Operating the processing system may comprise altering a construction operation based on the determined secondary information.

Operating the processing system may comprise scheduling maintenance of equipment based on the determined secondary information.

Operating the processing system may comprise: receiving multiple captured data of different data sources each attached with a respective expression of a relationship between the respective data source and the well construction system; matching each respective expression of the relationship between the respective data source and the well construction system with an expression in the relationship descriptor; and determining one of the multiple captured data that is likely to be most reliable based on the matching.

The secondary information may be a correlation factor between the captured data and additional captured data of an additional data source, and operating the processing system may comprise determining an occurrence of a fault in the well construction system based on the correlation factor exceeding a predefined threshold.

Operating the processing system may comprise validating additional captured data of an additional data source based on the secondary information by comparing the additional captured data to the secondary information, and the additional captured data may be validated when a difference between the secondary information and the additional captured data is within a predefined threshold.

Operating the processing system may comprise: monitoring an operational health of a piece of equipment of the well construction system by determining additional secondary information based on additional captured data from an additional data source, wherein the data source and the additional data source may be on the piece of equipment; determining problematic functionality of the piece of equipment based on a variation between the secondary information and the additional secondary information exceeding a predefined threshold over a predefined period of time; and signaling an alert associated with the determined problematic functionality.

Operating the processing system may comprise: monitoring an operation of a subsystem of the well construction system by determining additional secondary information based on additional captured data from an additional data source, wherein the data source and the additional data source may be at separate locations in the subsystem; determining problematic functionality of the subsystem based on a variation between the secondary information and the additional secondary information exceeding a predefined threshold; and signaling an alert associated with the determined problematic functionality.

Operating the processing system may comprise: monitoring security of the well construction system by determining additional secondary information based on additional captured data from an additional data source; determining a security breach based on a variation between the secondary information and the additional secondary information exceeding a predefined threshold; and signaling an alert associated with the determined security breach.

Determining the secondary information may include: determining a captured data rate of the captured data by the data source, and determining whether the captured data rate matches a configuration setting data rate for the matched expression. In such implementations, among others within the scope of the present disclosure, operating the processing system may comprise signaling a security alert when the captured data rate does not match the configuration setting data rate.

The captured data may be attached with a quality indicator indicative of a quality of the captured data, and operating the processing system may comprise: determining the secondary information when the quality indicator indicates a satisfactory quality; and discarding the captured data when the quality indicator indicates an unsatisfactory quality.

The present disclosure also introduces a method comprising operating a processing system comprising a processor and a memory including computer program code, wherein operating the processing system comprises: receiving captured data of a data source at an input port of the processing system, wherein the input port is mapped with an expression of a relationship between the data source and a location, equipment, a component, or a combination thereof of a well construction system; attaching the expression to the captured data; and transmitting the captured data and the attached expression to a network connection.

The data source may be a sensor and/or an actuator.

Operating the processing system may comprise attaching a quality indicator to the captured data, and the quality indicator may indicate a quality of the received captured data.

The present disclosure also introduces a method comprising, via a data acquisition unit: attaching a source expression to captured data of a data source, wherein the source expression indicates a relationship between the data source and a location, equipment, a component, or a combination thereof of a well construction system; and transmitting the captured data and the attached source expression into a network. The method also comprises, via an application unit: (A) receiving the captured data and the attached source expression from the network; (B) matching the source expression with a descriptor expression in a relationship descriptor, wherein the relationship descriptor comprises: (i) a description of a physical layout of equipment and components of the well construction system; and (ii) respective descriptor expressions of relationships between data sources and locations, equipment, components, or a combination thereof of the well construction system, wherein the descriptor expression in the relationship descriptor is one of the respective descriptor expressions; and (C) determining derivative information based on the captured data and the matched descriptor expression in the relationship descriptor.

The data source may be a sensor and/or an actuator.

The method may further comprise, via the data acquisition unit, attaching a quality indicator to the captured data, wherein the quality indicator indicates a quality of the captured data. In such implementations, among others within the scope of the present disclosure, the method may further comprise, via the application unit: determining the derivative information when the quality indicator indicates a satisfactory quality; and discarding the captured data when the quality indicator indicates an unsatisfactory quality.

The method may further comprise, via the application unit, altering a construction operation based on the determined derivative information.

The method may further comprise, via the application unit, scheduling maintenance of equipment based on the determined derivative information.

The method may further comprise, via the application unit: receiving multiple captured data of different data sources each attached with a respective source expression of a relationship between the respective data source and a respective location, equipment, component, or combination thereof of the well construction system; matching each respective source expression with a descriptor expression in the relationship descriptor; and determining one of the multiple captured data that is likely to be most reliable based on the matching.

The derivative information may be a correlation factor between the captured data and additional captured data of an additional data source, and the method may further comprise, via the application unit, determining an occurrence of a fault in the well construction system based on the correlation factor exceeding a predefined threshold.

The method may further comprise, via the application unit, validating additional captured data of an additional data source based on the derivative information by comparing the additional captured data to the derivative information, wherein the additional captured data is validated when a difference between the derivative information and the additional captured data is within a predefined threshold.

The method may further comprise, via the application unit: monitoring an operational health of a piece of equipment of the well construction system by determining additional derivative information based on additional captured data from an additional data source, wherein the data source and the additional data source may be on the piece of equipment; determining problematic functionality of the piece of equipment based on a variation between the derivative information and the additional derivative information exceeding a predefined threshold over a predefined period of time; and signaling an alert associated with the determined problematic functionality.

The method may further comprise, via the application unit: monitoring an operation of a subsystem of the well construction system by determining additional derivative information based on additional captured data from an additional data source, wherein the data source and the additional data source may be at separate locations in the subsystem; determining problematic functionality of the subsystem based on a variation between the derivative information and the additional derivative information exceeding a predefined threshold; and signaling an alert associated with the determined problematic functionality.

The method may further comprise, via the application unit: monitoring security of the well construction system by determining additional derivative information based on additional captured data from an additional data source; determining a security breach based on a variation between the derivative information and the additional derivative information exceeding a predefined threshold; and signaling an alert associated with the determined security breach.

Determining the derivative information may include: determining a captured data rate of the captured data by the data source; determining whether the captured data rate matches a configuration setting data rate for the matched descriptor expression; and via the application unit, signaling a security alert when the captured data rate does not match the configuration setting data rate.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
a system comprising a data acquisition unit, an application unit, and a network communicatively coupling the data acquisition unit and the application unit, wherein:
the data acquisition unit comprises a processor and a memory including computer program code, wherein the data acquisition unit is operable to:
receive captured data of a data source at an input port of the data acquisition unit, wherein the input port is mapped with a source expression of a relationship between the data source and a location, equipment, a component, or a combination thereof of a well construction system;
attach the source expression to the captured data; and
transmit the captured data and the attached source expression into the network; and
the application unit comprises a processor and a memory including computer program code, wherein the application unit is operable to:
receive the captured data and the attached source expression from the network;
match the source expression with a descriptor expression in a relationship descriptor, wherein the relationship descriptor comprises:
a description of a physical layout of equipment and components of the well construction system; and
respective descriptor expressions of relationships between data sources and locations, equipment, components, or combinations thereof of the well construction system, wherein the descriptor expression in the relationship descriptor is one of the respective descriptor expressions; and
determine derivative information based on the captured data and the matched descriptor expression in the relationship descriptor.

2. The apparatus of claim 1 wherein the data source is a sensor.

3. The apparatus of claim 1 wherein the data source is an actuator.

4. The apparatus of claim 1 wherein the data acquisition unit is further operable to attach a quality indicator to the captured data, and wherein the quality indicator indicates a quality of the received captured data.

5. The apparatus of claim 4 wherein the application unit is further operable to:
determine the derivative information when the quality indicator indicates a satisfactory quality; and
discard the captured data when the quality indicator indicates an unsatisfactory quality.

6. The apparatus of claim 1 wherein the application unit is further operable to alter a construction operation based on the determined derivative information.

7. The apparatus of claim 1 wherein the application unit is further operable to schedule maintenance of equipment based on the determined derivative information.

8. The apparatus of claim 1 wherein the application unit is further operable to:
receive multiple captured data of different data sources each attached with a respective source expression of a relationship between the respective data source and a respective location, equipment, component, or combination thereof of the well construction system;
match each respective source expression with a descriptor expression in the relationship descriptor; and
determine one of the multiple captured data that is likely to be most reliable based on the matching.

9. The apparatus of claim 1 wherein:
the derivative information is a correlation factor between the captured data and additional captured data of an additional data source; and
the application unit is further operable to determine an occurrence of a fault in the well construction system based on the correlation factor exceeding a predefined threshold.

10. The apparatus of claim 1 wherein:
the application unit is further operable to validate additional captured data of an additional data source based on the derivative information by comparing the additional captured data to the derivative information; and
the additional captured data is validated when a difference between the derivative information and the additional captured data is within a predefined threshold.

11. The apparatus of claim 1 wherein the application unit is further operable to:
monitor an operational health of a piece of equipment of the well construction system by determining additional derivative information based on additional captured data from an additional data source, wherein the data source and the additional data source are on the piece of equipment; and
determine problematic functionality of the piece of equipment based on a variation between the derivative information and the additional derivative information exceeding a predefined threshold over a predefined period of time.

12. The apparatus of claim 1 wherein the application unit is further operable to:
monitor an operation of a subsystem of the well construction system by determining additional derivative information based on additional captured data from an additional data source, wherein the data source and the additional data source are at separate locations in the subsystem; and determine problematic functionality of the subsystem based on a variation between the derivative information and the additional derivative information exceeding a predefined threshold.

13. The apparatus of claim 1 wherein the application unit is further operable to:
monitor security of the well construction system by determining additional derivative information based on additional captured data from an additional data source; and
determine a security breach based on a variation between the derivative information and the additional derivative information exceeding a predefined threshold.

14. The apparatus of claim 1 wherein:
the derivative information includes a matching indication;
the matching indication indicates whether a captured data rate of the captured data by the data source matches a configuration setting data rate for the matched descriptor expression; and
the application unit is further operable to signal a security alert when the matching indication indicates that the captured data rate does not match the configuration setting data rate.

15. A method comprising:
operating a processing system comprising a processor and a memory including computer program code, wherein operating the processing system comprises:
receiving captured data of a data source attached with an expression of a relationship between the data source and a well construction system;
matching the expression of the relationship between the data source and the well construction system with an expression in a relationship descriptor, wherein the relationship descriptor comprises:
a description of a physical layout of equipment and components of the well construction system; and
respective expressions of relationships between data sources and locations, equipment, components, or a combination thereof of the well construction system, wherein the expression in the relationship descriptor is one of the respective expressions; and
determining secondary information based on the captured data and the matched expression in the relationship descriptor.

16. The method of claim 15 wherein operating the processing system further comprises:
receiving multiple captured data of different data sources each attached with a respective expression of a relationship between the respective data source and the well construction system;
matching each respective expression of the relationship between the respective data source and the well construction system with an expression in the relationship descriptor; and
determining one of the multiple captured data that is likely to be most reliable based on the matching.

17. The method of claim 15 wherein:
the secondary information is a correlation factor between the captured data and additional captured data of an additional data source; and
operating the processing system further comprises determining an occurrence of a fault in the well construction system based on the correlation factor exceeding a predefined threshold.

18. The method of claim 15 wherein:
operating the processing system further comprises validating additional captured data of an additional data source based on the secondary information by comparing the additional captured data to the secondary information; and
the additional captured data is validated when a difference between the secondary information and the additional captured data is within a predefined threshold.

19. A method comprising:
operating a processing system comprising a processor and a memory including computer program code, wherein operating the processing system comprises:
receiving captured data of a data source at an input port of the processing system, wherein the input port is mapped with an expression of a relationship between the data source and a location, equipment, a component, or a combination thereof of a well construction system;
attaching the expression to the captured data; and
transmitting the captured data and the attached expression to a network connection.

20. The method of claim 19 wherein:
the data source is a sensor or an actuator;
operating the processing system further comprises attaching a quality indicator to the captured data; and
the quality indicator indicates a quality of the received captured data.

* * * * *